(12) United States Patent
Hodge et al.

(10) Patent No.: US 10,025,380 B2
(45) Date of Patent: Jul. 17, 2018

(54) ELECTRONIC DEVICES WITH GAZE DETECTION CAPABILITIES

(71) Applicant: Apple Inc., Cupertino, CA (US)

(72) Inventors: Andrew Hodge, Palo Alto, CA (US); Michael Rosenblatt, Campbell, CA (US)

(73) Assignee: Apple Inc., Cupertino, CA (US)

(\*) Notice: Subject to any disclaimer, the term of this patent is extended or adjusted under 35 U.S.C. 154(b) by 6 days.

(21) Appl. No.: 14/157,909

(22) Filed: Jan. 17, 2014

(65) Prior Publication Data

US 2014/0132508 A1 May 15, 2014

Related U.S. Application Data

(62) Division of application No. 13/750,877, filed on Jan. 25, 2013, which is a division of application No. 12/242,251, filed on Sep. 30, 2008.

(51) Int. Cl.
*G06F 3/01* (2006.01)
*G06F 1/32* (2006.01)
*H04N 21/443* (2011.01)
*H04W 52/02* (2009.01)

(52) U.S. Cl.
CPC ............ *G06F 3/013* (2013.01); *G06F 1/3206* (2013.01); *G06F 1/3265* (2013.01); *H04N 21/4436* (2013.01); *G09G 2330/021* (2013.01); *H04W 52/027* (2013.01); *Y02D 10/153* (2018.01); *Y02D 70/00* (2018.01); *Y02D 70/12* (2018.01); *Y02D 70/122* (2018.01); *Y02D 70/142* (2018.01); *Y02D 70/144* (2018.01);

(Continued)

(58) Field of Classification Search
CPC .... G06F 1/3203; G06F 1/3206; G06F 1/3231; G06F 1/3265; G06F 3/013; G09G 2330/021; G09G 2330/022
See application file for complete search history.

(56) References Cited

U.S. PATENT DOCUMENTS

| | | |
|---|---|---|
| 5,583,795 A | 12/1996 | Smyth |
| 5,996,080 A | 11/1999 | Silva et al. |
| 6,526,159 B1 | 2/2003 | Nickerson |

(Continued)

OTHER PUBLICATIONS

"Methods of Power Optimization Based on User Presence and Gaze Detection" IBM, [online], retrieved Sep. 30, 2008, <http://www.priorartdatabase.com/IPCOM/000142549/>.

*Primary Examiner* — Dorothy Harris
(74) *Attorney, Agent, or Firm* — Treyz Law Group, P.C.; G. Victor Treyz; Zachary D. Hadd

(57) ABSTRACT

An electronic device may have gaze detection capabilities that allow the device to detect when a user is looking at the device. The electronic device may implement a power management scheme using the results of gaze detection operations. When the device detects that the user has looked away from the device, the device may dim a display screen and may perform other suitable actions. The device may pause a video playback operation when the device detects that the user has looked away from the device. The device may resume the video playback operation when the device detects that the user is looking towards the device. Gaze detector circuitry may be powered down when sensor data indicates that gazed detection readings will not be reliable or are not needed.

23 Claims, 10 Drawing Sheets

(52) U.S. Cl.
CPC ............ *Y02D 70/164* (2018.01); *Y02D 70/23* (2018.01); *Y02D 70/26* (2018.01)

(56) References Cited

U.S. PATENT DOCUMENTS

| | | |
|---|---|---|
| 6,661,907 B2 | 12/2003 | Ho et al. |
| 6,734,845 B1 * | 5/2004 | Nielsen et al. ............... 345/211 |
| 6,956,564 B1 | 10/2005 | Williams |
| 6,970,723 B2 | 11/2005 | Chigira |
| 7,091,471 B2 | 8/2006 | Wenstrand et al. |
| 7,152,172 B2 | 12/2006 | Tsirkel et al. |
| 7,379,560 B2 | 5/2008 | Bradski et al. |
| 2002/0151297 A1 | 10/2002 | Remboski et al. |
| 2002/0173344 A1 * | 11/2002 | Cupps ................... G06F 1/1626 455/566 |
| 2002/0180799 A1 | 12/2002 | Peck et al. |
| 2003/0038754 A1 * | 2/2003 | Goldstein ................ G06F 3/013 345/7 |
| 2004/0081337 A1 * | 4/2004 | Tsirkel .................. G06F 1/3203 382/118 |
| 2004/0170304 A1 | 9/2004 | Haven et al. |
| 2004/0175020 A1 * | 9/2004 | Bradski ................. G06F 1/3203 382/103 |
| 2004/0181703 A1 | 9/2004 | Lilja et al. |
| 2005/0071698 A1 * | 3/2005 | Kangas ................. G06F 1/3203 713/300 |
| 2005/0094849 A1 | 5/2005 | Sung et al. |
| 2005/0175218 A1 * | 8/2005 | Vertegaal ............... A61B 3/113 382/103 |
| 2005/0236488 A1 | 10/2005 | Kricorissian |
| 2005/0289363 A1 * | 12/2005 | Tsirkel .................. G06F 1/3203 713/300 |
| 2006/0093998 A1 * | 5/2006 | Vertegaal ................ G06F 3/011 434/236 |
| 2006/0140452 A1 * | 6/2006 | Raynor ................. G06F 1/3203 382/115 |
| 2007/0024579 A1 | 2/2007 | Rosenberg |
| 2007/0072553 A1 | 3/2007 | Barbera |
| 2007/0075965 A1 * | 4/2007 | Huppi ................... G06F 3/0418 345/156 |
| 2007/0078552 A1 * | 4/2007 | Rosenberg ............ G06F 1/1626 700/94 |
| 2007/0132734 A1 | 6/2007 | Kwak et al. |
| 2008/0095402 A1 | 4/2008 | Kochi et al. |
| 2009/0033618 A1 | 2/2009 | Norager |
| 2009/0066722 A1 * | 3/2009 | Kriger ................... G06Q 30/02 345/619 |
| 2009/0219224 A1 | 9/2009 | Elg |

* cited by examiner

ELECTRONIC DEVICES WITH GAZE DETECTION CAPABILITIES

This application is a divisional of patent application Ser. No. 13/750,877, filed Jan. 25, 2013, which is a divisional of patent application Ser. No. 12/242,251, filed Sep. 30, 2008, each of which is hereby incorporated by referenced herein in their entireties. This application claims the benefit of and claims priority to patent application Ser. No. 13/750,877, filed Jan. 25, 2013 and patent application Ser. No. 12/242,251, filed Sep. 30, 2008.

BACKGROUND

This invention relates generally to electronic devices, and more particularly, to electronic devices such as portable electronic devices that have gaze detection capabilities.

Electronic devices such as portable electronic devices are becoming increasingly popular. Examples of portable devices include handheld computers, cellular telephones, media players, and hybrid devices that include the functionality of multiple devices of this type. Popular portable electronic devices that are somewhat larger than traditional handheld electronic devices include laptop computers and tablet computers.

To satisfy consumer demand for small form factor portable electronic devices, manufacturers are continually striving to reduce the size of components that are used in these devices. For example, manufacturers have made attempts to miniaturize the batteries used in portable electronic devices.

An electronic device with a small battery has limited battery capacity. Unless care is taken to consume power wisely, an electronic device with a small battery may exhibit unacceptably short battery life. Techniques for reducing power consumption may be particularly important in wireless devices that support cellular telephone communications, because users of cellular telephone devices often demand long "talk" times.

Conventional portable electronic devices use various techniques for reducing their power consumption. Because display screens in electronic devices can consume relatively large amounts of power, power conservation techniques in portable electronic devices with display screens typically involve turning off the display screens at particular times. Unfortunately, conventional power conservation techniques may turn off display screens at inappropriate times, thereby interfering with a user's ability to interact with a device. Conventional techniques may also leave display screens on at inappropriate times, wasting valuable battery power.

It would therefore be desirable to be able to provide improved ways in which to conserve power in electronic devices.

SUMMARY

An electronic device is provided that may have gaze detection capabilities. One or more gaze detection sensors such as a camera may be used by the electronic device to determine whether a user's gaze is directed towards the electronic device (e.g., whether the user of the electronic device is looking at the electronic device). In particular, the electronic device may use gaze detection sensors to determine whether or not the user is looking at a display portion of the electronic device.

In an illustrative embodiment, the electronic device may have power management capabilities that are used to help conserve power. The electronic device may operate in two or more operating modes. One operation mode may be used to optimize performance. Another operating mode may help to extend battery life. The electronic device may use results from gaze detection operations to determine an appropriate mode in which to operate the electronic device.

For example, the electronic device may operate in an active mode when the electronic device determines, using gaze detection sensors, that the user's gaze is directed towards the electronic device and may operate in one or more standby modes when the device determines that the user's gaze is not directed towards the electronic device. When the electronic device is operating in one of the standby modes, circuitry and components such as a display screen, touch screen components, gaze detection components, and a central processing unit or CPU in the electronic device may be powered down or operated in a low-power mode to minimize power consumption in the electronic device.

With one suitable arrangement, when the electronic device is in the active mode and detects that the user has looked away from the device, the electronic device may dim or turn off a display screen. If desired, the electronic device can dim the display screen to a standby brightness level after the device has determined that the user has looked away from the device. After a given period of time has elapsed in which no user input has been received by the electronic device, the electronic device can turn off the display screen to conserve power. When the electronic device detects that the user's gaze is directed towards the electronic device, the electronic device may enter the active mode and return the display screen to an active brightness level (e.g., turn on the display screen or brighten the display screen to the active brightness level).

If desired, the electronic device may be performing an operation, while in the active mode, that is uninterrupted when the electronic device switches to operating in one of the standby modes. For example, the electronic device may be performing a music playback operation while in the active mode and, when the electronic device detects the user's gaze is not directed towards the electronic device, the electronic device may enter one of the standby modes without interrupting the music playback operation.

With one suitable arrangement, the electronic device may interrupt an operation when the electronic device begins operating in one of the standby mode. For example, the electronic device may be performing a video playback operation while in the active mode. In this example, when the electronic device detects that the user's gaze is no longer directed towards the electronic device, the electronic device may enter one of the standby modes, dim the display screen that was being used for the video playback operation, and pause the video playback operation. If desired, the electronic device may resume the video playback operation when it detects that the user has redirected their gaze towards the electronic device (e.g., towards the video screen).

In an illustrative embodiment, the electronic device may use readings from sensors such as proximity sensors, ambient light sensors, and motion sensors such as accelerometers to determine whether or not to perform gaze detection operations. For example, the electronic device may suspend gaze detection operations whenever a proximity sensor, ambient light sensor, or accelerometer indicates that gaze detection operations are inappropriate (e.g., because of an object in close proximity with the electronic device, insufficient ambient light for gaze detection sensors to detect the user's gaze, excessive vibration which may degrade the performance of gaze detection sensors, etc.).

An advantage of powering down the display is that a powered down display can help to prevent information on the display from being viewed by an unauthorized viewer. It may therefore be helpful to turn off a display when the lack of a user's gaze indicates that the user is not present to guard the device.

Further features of the invention, its nature and various advantages will be more apparent from the accompanying drawings and the following detailed description of the preferred embodiments.

DETAILED DESCRIPTION

Figure 1:
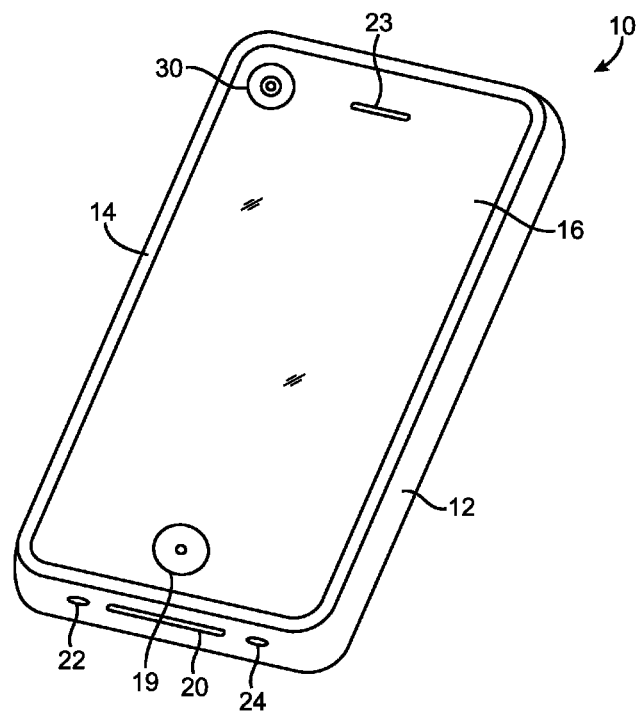
FIG. 1 is a perspective view of an illustrative portable electronic device that may have gaze detection capabilities in accordance with an embodiment of the present invention.

The present invention relates generally to electronic devices, and more particularly, to electronic devices such as portable electronic devices that have gaze detection capabilities.

With one suitable arrangement, an electronic device with gaze detection capabilities may have the ability to determine whether a user's gaze is within a given boundary without resolving the specific location of the user's gaze within that boundary. The electronic device, as an example, may be able to detect whether a user's gaze is directed towards a display associated with the device. With another suitable arrangement, an electronic device may have gaze tracking capabilities. Gaze tracking capabilities allow the electronic device to determine not only whether or not a user's gaze is directed towards a display associated with the device but also which portion of the display the user's gaze is directed towards.

An electronic device may be used to detect a user's gaze and adjust its behavior according to whether or not the user's gaze is detected. For example, the electronic device may be able to detect whether or not the user is looking at the device and adjust power management settings accordingly. With one suitable arrangement, the electronic device may delay turning device components off (e.g., components which would otherwise be turned off as part of a power management scheme) while the user's gaze is directed towards the device and the electronic device may accelerate the shutdown of device components when the user's gaze is not detected. For example, when the user's gaze is detected, a device with a display may keep the display at normal brightness rather than dimming the display and, when the device detects the user is no longing looking at the device, the device may dim or turn off the display. This type of arrangement may be especially beneficial in situations in which the user is not actively controlling the electronic device (e.g., the user is not pressing buttons or supplying touch screen inputs) but is still interacting with the electronic device (e.g., the user is reading text on the display, watching video on the display, etc.). An advantage of turning off the display when the user is not looking at the display is this may help prevent unauthorized users from viewing information on the display, thereby enhancing device security.

Electronic devices that have gaze detection capabilities may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality, and supports web browsing. These are merely illustrative examples.

An illustrative portable electronic device in accordance with an embodiment of the present invention is shown in FIG. 1. User device 10 may be any suitable electronic device such as a portable or handheld electronic device. Device 10 of FIG. 1 may be, for example, a handheld electronic device that supports 2G and/or 3G cellular telephone and data functions, global positioning system capabilities or other satellite navigation capabilities, and local wireless communications capabilities (e.g., IEEE 802.11 and Bluetooth®) and that supports handheld computing device functions such as internet browsing, email and calendar functions, games, music player functionality, etc.

Device 10 may have a housing 12. Display 16 may be attached to housing 12 using bezel 14. Display 16 may be a touch screen liquid crystal display (as an example). Display 16 may have pixels that can be controlled individually in connection with power consumption adjustments. For example, in an organic light emitting diode (OLED) display, power can be reduced by making full and/or partial brightness reductions to some or all of the pixels. Display 16 may be formed from a panel subsystem and a backlight subsystem. For example, display 16 may have a liquid crystal display (LCD) panel subsystem and a light emitting diode or fluorescent tube backlight subsystem. In backlight subsystems that contain individually controllable elements such as light emitting diodes, the brightness of the backlight elements may be selectively controlled. For example, the brightness of some of the backlight elements may be reduced while the other backlight elements remain fully powered. In backlight subsystems that contain a single backlight element, the power of the single element may be partially or fully reduced to reduce power consumption. It may also be advantageous to make power adjustments to the circuitry that drives the LCD panel subsystem.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

If desired, device 10 may contain sensors such as a proximity sensor and an ambient light sensor. A proximity sensor may be used to detect when device 10 is close to a user's head or other object. An ambient light sensor may be used to make measurements of current light levels.

Device 10 may have a camera or other optical sensor such as camera 30 that can be used for gaze detection operations. Cameras used for gaze detection may, for example, be used by device 10 to capture images of a user's face that are processed by device 10 to detect where the user's gaze is directed. Camera 30 may be integrated into housing 12. While shown as being formed on the top face of electronic device 10 in the example of FIG. 1, cameras such as camera 30 may generally be formed on any suitable portion of electronic device 10. For example, camera 30 may be mounted on a flip-up portion of device 10 that is attached to a main body portion of device 10 by a hinge or may be mounted between the flip-up portion of device 10 and the main body portion of device 10 (e.g., in the hinge region between the flip-up portion and the main body portion such that the camera can be used regardless of whether the device is flipped open or is closed). Device 10 may also have additional cameras (e.g., device 10 may have camera 30 on the top face of device 10 for gaze detection operations and another camera on the bottom face of device 10 for capturing images and video).

If desired, the gaze detection functions of camera 30 may be implemented using an optical sensor that has been optimized for gaze detection operations. For example, camera 30 may include one or more light emitting diodes (LED's) and an optical sensor capable of detecting reflections of light emitted from the LEDs off of the users' eyes when the users are gazing at device 10. The light emitting diodes may emit a modulated infrared light and the optical sensor may be synchronized to detect reflections of the modulated infrared light, as an example. In general, any suitable gaze detection image sensor and circuitry may be used for supporting gaze detection operations in device 10. The use of camera 30 is sometimes described herein as an example.

Figure 2:
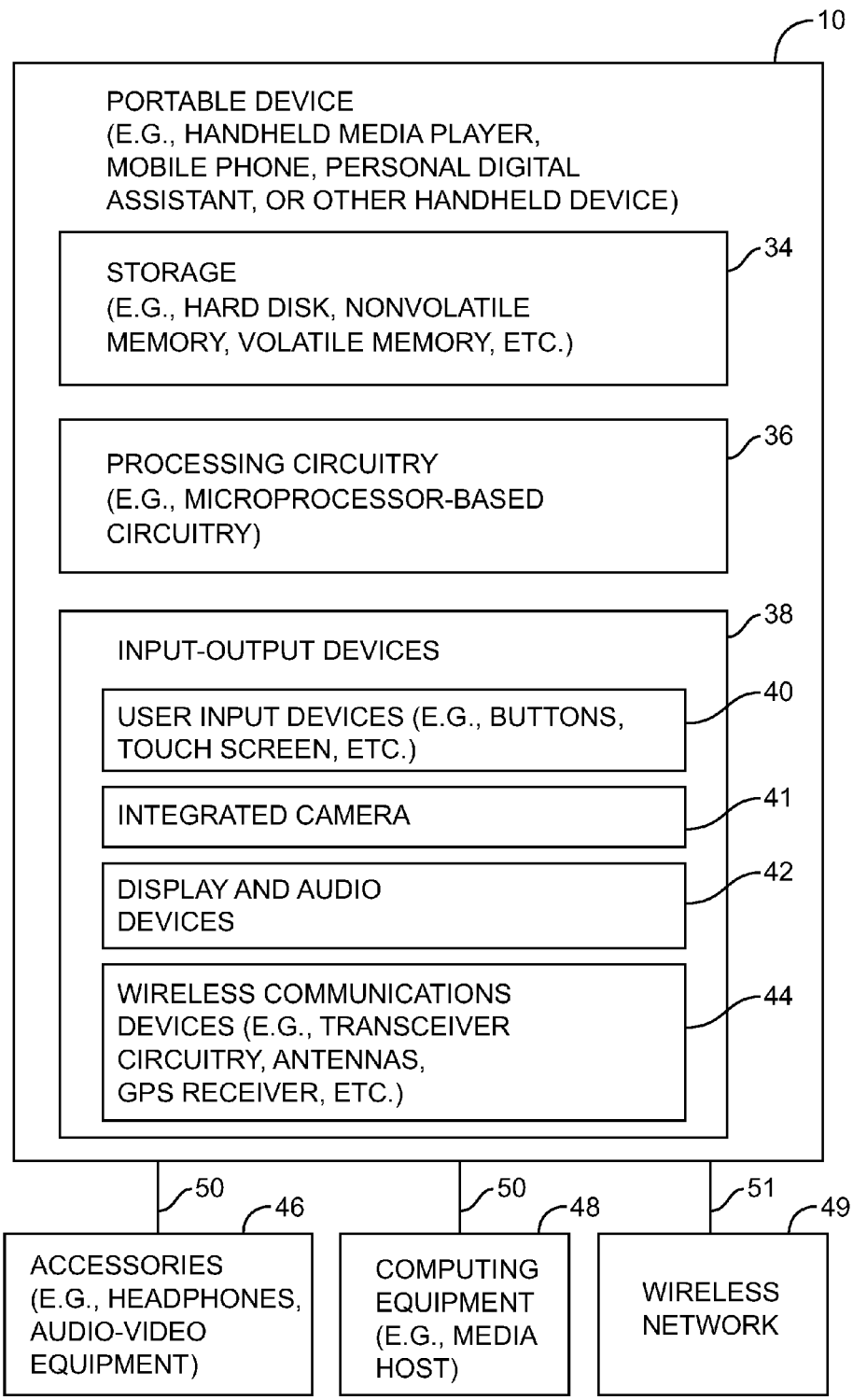
FIG. 2 is a schematic diagram of an illustrative portable electronic device that may have gaze detection capabilities in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as gaze detection applications, internet browsing applications, voice-over-internet-protocol (VOIP) telephone call applications, email applications, media playback applications, navigation functions, map functions, operating system functions, power management functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, etc. If desired, processing circuitry 36 may operate in a reduced power mode (e.g., circuitry 36 may be suspended or operated at a lower frequency) when device 10 enters a suitable standby mode.

Input-output devices 38 may be used to allow data to be supplied to device 10 and to allow data to be provided from device 10 to external devices. Display screen 16, camera 30, button 19, microphone port 24, speaker port 22, and dock connector port 20 are examples of input-output devices 38. In general, input-output devices 38 may include any suitable components for receiving input and/or providing output from device 10. For example, input-output devices 38 can include user input-output devices 40 such as buttons, touch screens, joysticks, click wheels, scrolling wheels, touch pads, key pads, keyboards, microphones, etc. A user can control the operation of device 10 by supplying commands through user input devices 40. Input-output device 38 may include sensors such as proximity sensors, ambient light sensors, orientation sensors, proximity sensors, and any other suitable sensors.

Input-output devices 38 may include a camera such as integrated camera 41 (e.g., a camera that is integrated into the housing of device 10) and camera 30 of FIG. 1. Cameras such as camera 41 and camera 30 may be used as part of a gaze detection system. For example, camera 41 may be used by device 10 to capture images that are processed by a gaze detection application running on processing circuitry 36 to determine whether or not a user's gaze is directed towards the device. Cameras such as camera 41 and camera 30 may, if desired, be provided with image stabilization capabilities (e.g., using feedback derived from an accelerometer, orientation sensor, or other sensor).

Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49, as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc.

A device such as device 10 that has gaze detection capabilities may use gaze detector data in implementing a power management scheme. As an example, device 10 may operate in multiple modes to conserve power and may utilize gaze detection operations to assist in determining an appropriate mode in which to operate.

With one suitable arrangement, the operational modes of device 10 may include modes such as an active mode, a partial standby mode, and a full standby mode. In these and other operational modes, device 10 may adjust the brightness of display 16 and may turn display 16 on or off whenever appropriate in order to conserve power. For example, display 16 may be at an active brightness when device 10 is in the active mode, a standby brightness when device 10 is in the partial standby mode, and may be turned off when device 10 is in the full standby mode. The standby brightness may be somewhat dimmer than the active brightness. Generally, the power consumption of display 16 and therefore device 10 will be reduced when the brightness of display 16 is reduced and when display 16 is turned off.

Figure 3:
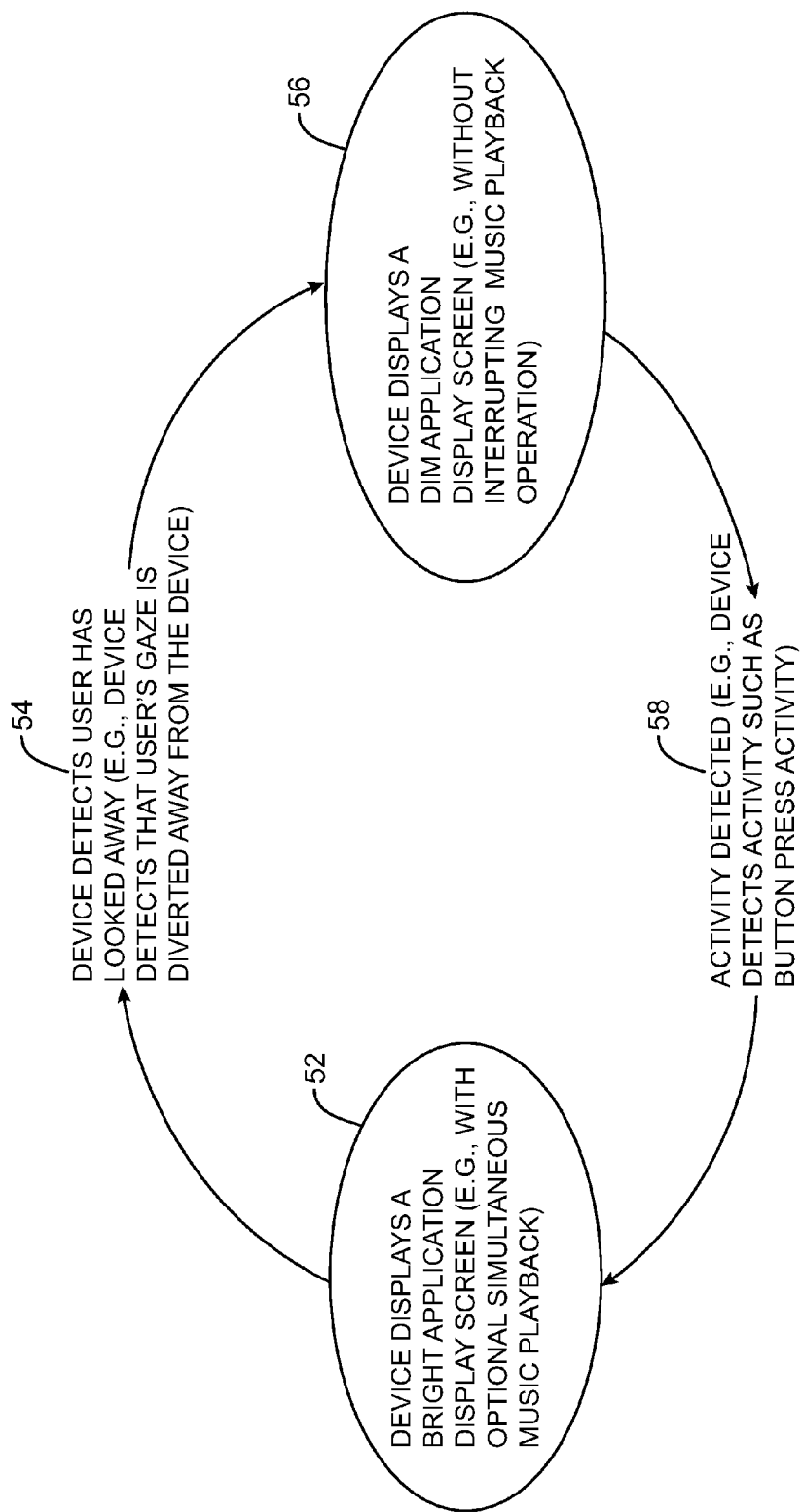
FIG. 3 is a state diagram of illustrative operating modes of an illustrative electronic device with gaze detection capabilities in accordance with an embodiment of the present invention.

Consider, as an example, the scenario of FIG. 3. In mode 52 of FIG. 3, device 10 is in an active mode. In general, it is generally desirable for device 10 to be in the active mode whenever a user is actively interacting with device 10. In particular, it is desirable for display 16 to be at the active brightness level whenever the user's gaze is directed towards display 16.

When device 10 is in the active mode, a display such as display 16 may be turned on and may display an appropriate screen such as an application display screen at the active brightness level. The active brightness level may be a configurable brightness level. For example, device 10 may receive input from a user to adjust the active brightness level. In general, the active brightness level may be adjusted anywhere between the maximum brightness and minimum brightness level display 16 is capable of.

If desired, device 10 may be performing a music playback operation when device 10 is in the active mode. In the example of FIG. 3, the music playback operation may be occurring in the background of the operation of device 10 (e.g., device 10 may be performing the music playback operation while display 16 and user input device 40 are used by the user to perform additional tasks such as writing an e-mail, browsing the web, etc.).

While device 10 is in the active mode, device 10 may be performing gaze detection operations. For example, when device 10 is in the active mode, device 10 may be capturing images using camera 30 or other image sensing components at regular intervals and maybe analyzing the images using gaze detection software. Based on this analysis, the device can determine whether the user's gaze is directed towards device 10 and display 16. When device 10 is performing gaze detection operations, device 10 may be capturing images used for the gaze detection operations at any suitable interval such as thirty times per second, ten times per second, twice per second, once per second, every two seconds, every five seconds, upon occurrence of non-time-based criteria, combinations of these intervals, or at any other suitable time.

As illustrated by line 54, when device 10 detects that the user has looked away, device 10 may dim display screen 16 and may enter partial standby mode 56. Device 10 may detect that the user has diverted their gaze away from device 10 and display 16 using a gaze detection sensor such as camera 30 and gaze detection software running on the hardware of device 10. If desired, gaze detection processing may be offloaded to specialized gaze detection circuitry (e.g., circuitry in a gaze detection chip or a camera controller).

In mode 56, device 10 is in a partial standby mode. In the partial standby mode, the brightness level of display 16 may be reduced from an active brightness level to a standby brightness level to reduce the power consumption of device 10. When device 10 enters a standby mode such as the partial standby mode, some operations running on device 10 may be suspended or stopped and some operations may continue running. For example, a music playback operation may continue when device 10 enters one of its standby modes while a web browsing application may be suspended. With this type of arrangement, when a user of device 10 is listening to music through the device while browsing the web on display 16, device 10 can dim display 16 to conserve power whenever the user looks away from display 16 while continuing to play back the music that the user is listening to without interruption.

As illustrated by line 58, when device 10 detects activity, device 10 may brighten display screen 16 and may enter active mode 52. Device 10 may enter active mode 52 in response to user activity such as button press activity received through a button such as button 19 and in response to other activity such as network activity (e.g., activity received through a wired or wireless communications link). In this type of arrangement, device 10 will enter the active mode whenever a user resumes interacting with device 10.

Figure 4:
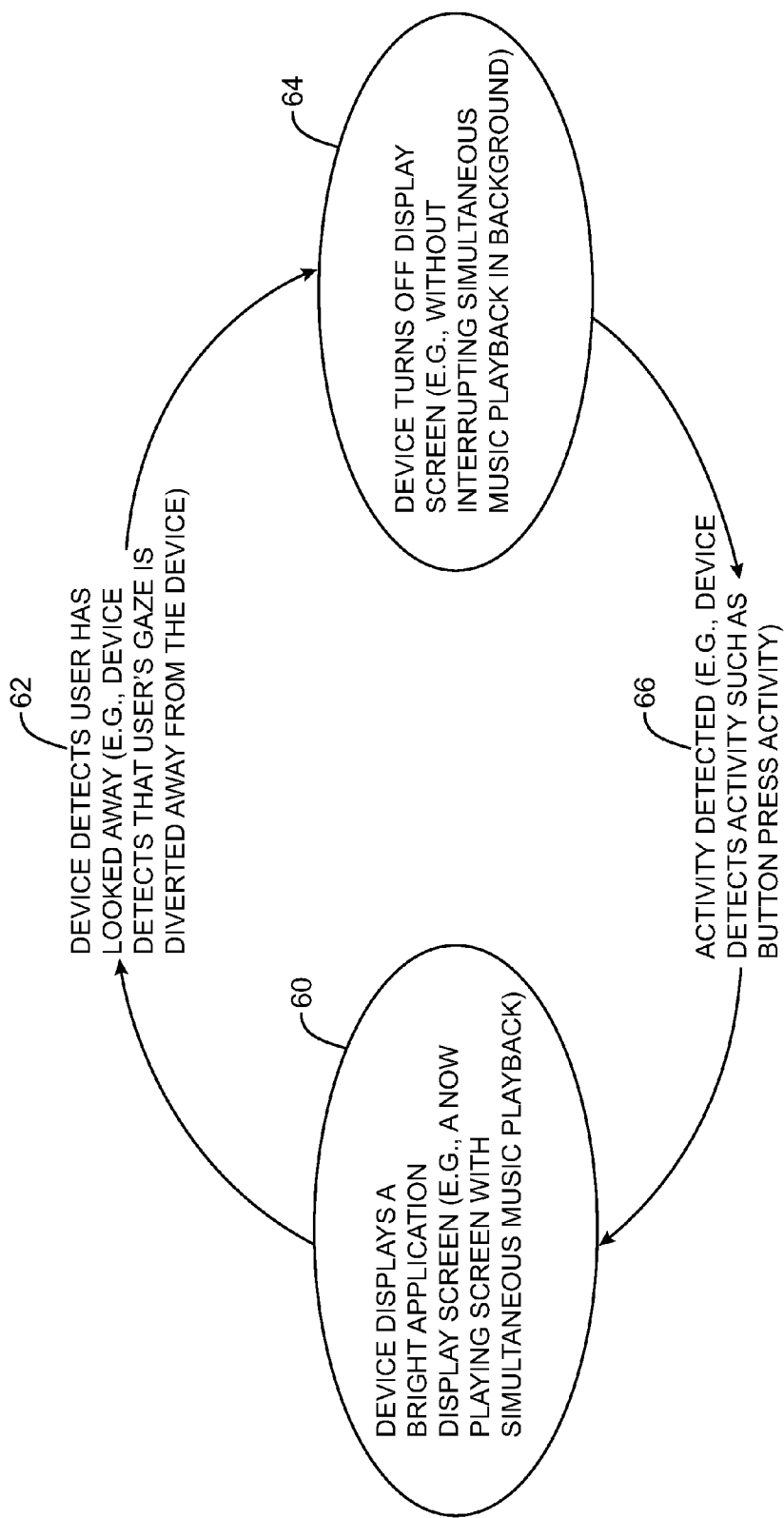
FIG. 4 is a state diagram of illustrative operating modes of an illustrative electronic device with gaze detection capabilities during a music playback operation in accordance with an embodiment of the present invention.

As illustrated by FIG. 4, device 10 may implement a power management scheme that turns off display 16 based on gaze detection data. In particular, device 10 may turn off display 16 when the device detects that the user is not looking at display 16 (e.g., rather than merely dimming display 16 as in the example of FIG. 3).

In mode 60, device 10 is in an active mode. While device 10 is in the active mode, device 10 may perform gaze detection operations. Because device 10 is in the active mode, display 16 may be at an active brightness level. With one suitable arrangement, when device 10 is in active mode 60, device 10 may be displaying a screen with display 16 that is of interest to the user but which does not demand the user's constant attention. For example, when device 10 is in mode 60, device 10 may be displaying a screen such as a now playing screen associated with a music playback operation or a telephone information screen associated with a telephone operation (e.g., a new incoming call, a new outgoing call, an active call, etc.). The now playing screen may, for example, include information about the music playback operation such as a track name, album name, artist name, elapsed playback time, remaining playback time, album art, etc. and may include on-screen selectable options (e.g., when display 16 is a touch-screen display) such as play, pause, fast forward, rewind, skip ahead (e.g., to another audio track), skip back, stop, etc. A telephone information screen might include information about a telephone operation such as a current call time, the telephone number associated with a telephone call, a contact name associated with the telephone call, and an image associated with the telephone call and may include on-screen selectable options such as a keypad to enter a telephone number, a call button, an end call button, a hold button, a speakerphone button, a mute button, an add call button, a contacts button, etc.

As illustrated by line 62, when device 10 detects that the user has looked away from display 16, device 10 may turn off display 16 and may enter standby mode 64. When device 10 is in standby mode 64, device 10 may continue to perform background operations such as a music playback operation that was occurring before device 10 entered standby mode 64 (e.g., before device 10 detected that the user's gaze was diverted away from display 16). Because the application screen displayed in mode 60 is of secondary importance to the user, device 10 may turn off display 16 completely when the user looks away without disrupting the user. For example, when a user is listening to an audio track and is also viewing information associated with the audio track on a now playing screen, device 10 can turn off display 16 when the user looks away, while continuing an audio playback operation. The user's primary use of device 10 (listening to music) is not interrupted, even though the secondary use of device 10 (viewing the now playing screen) has been halted.

In mode 64, device 10 is in a standby mode. In standby mode 64, display 16 may be turned off by device 10 to conserve power. When device 10 enters standby mode 64, suitable components of device 10 may be powered down (if desired). For example, in mode 64, the power consumption of processing circuitry 36 may be reduced (e.g., by operating fewer processor cores, by reducing the computing frequency of circuitry 36, etc.). With one suitable arrangement, an operation such as a music playback operation or a telephone call may continue when device 10 is in mode 64.

As illustrated by line 66, when device 10 detects activity such as user activity, device 10 may enter active mode 60 and turn on display 16. Device 10 may enter active mode 60 in response to any suitable activity such as button press activity, network activity, and gaze detection activity (e.g., when device 10 detects that the user has directed their gaze towards device 10).

Figure 5:
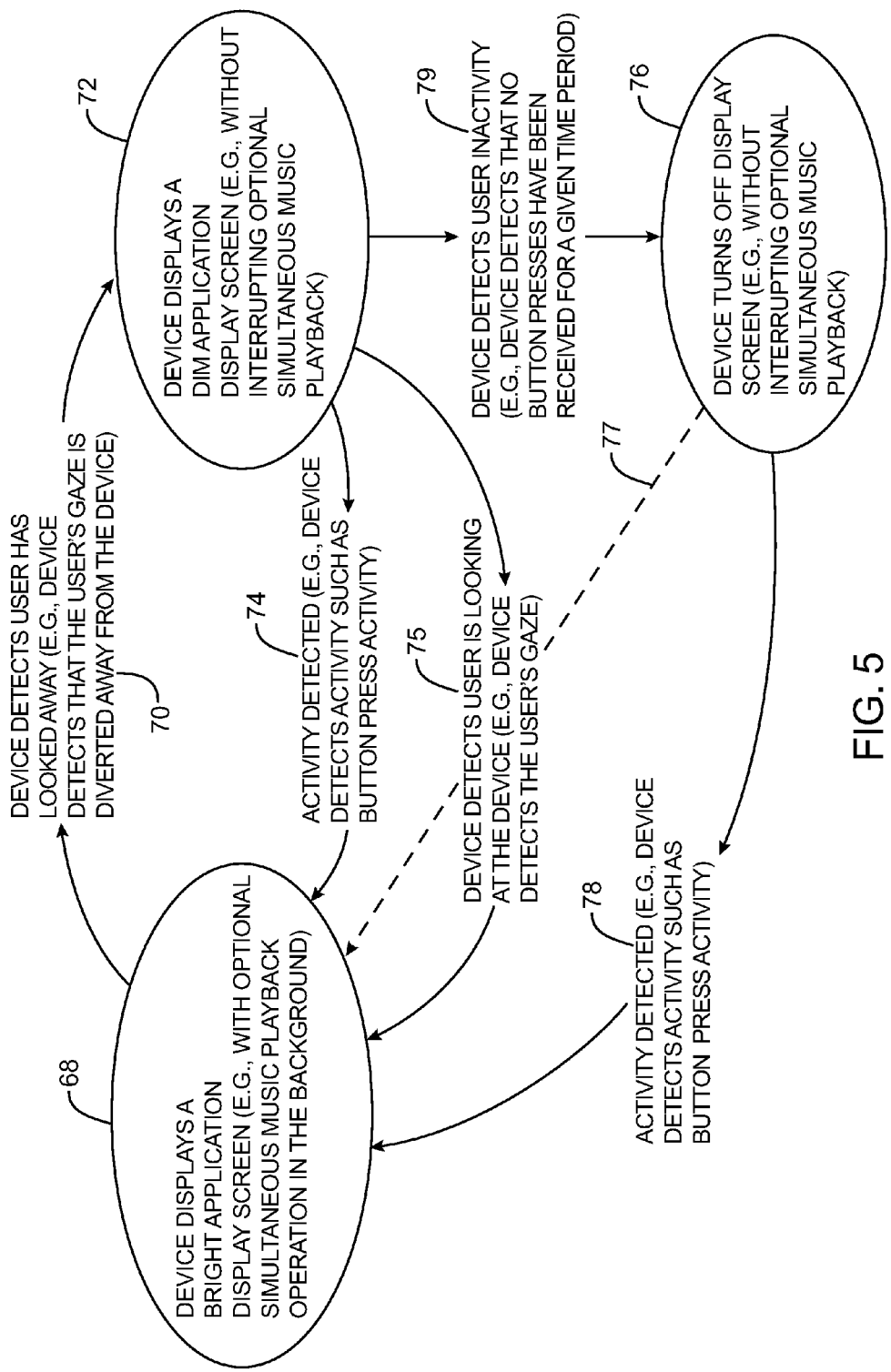
FIG. 5 is a state diagram of illustrative operating modes of an illustrative electronic device with gaze detection capabilities and activity detection capabilities in accordance with an embodiment of the present invention.

As shown in the example of FIG. 5, device 10 may implement a power management scheme that is responsive to gaze detection data and other input data (e.g., user input, network input, etc.). In the power management scheme illustrated in FIG. 5, device 10 can switch between an active mode, a partial standby mode, and a standby mode. Device 10 may power down hardware components and suspend or slow down software operations depending on the mode in which device 10 is operating. For example, when device 10 is in either of the standby modes, device 10 may reduce the number of processing cores utilized by circuitry 36 and/or may reduce the processing frequency (clock rate) of circuitry such as circuitry 36. With one suitable arrangement, device 10 may turn display 16 on at an active brightness level in the active mode, dim display 16 to a standby brightness level in the partial standby mode, and turn display 16 off in the standby mode.

In mode 68, device 10 is in an active mode. While device 10 is in the active mode, device 10 may perform gaze detection operations. Display 16 may be at the active brightness level while device 10 is in active mode 68. In mode 68, device 10 may be displaying an application display screen such as a home page, a music playback application screen, a web browsing application screen, an email application screen, etc. If desired, device 10 may also be performing a music playback operation while in mode 68 (e.g., device 10 may be performing the music playback operation as a background process as device 10 displays the application display screen).

When device 10 detects that the user has looked away from display 16 (e.g., using a gaze detection sensor such as camera 30), device 10 may dim display 16 and enter partial standby mode 72, as illustrated by line 70.

In mode 72, device 10 is in a partial standby mode. In partial standby mode 72, device 10 may dim display 16 to a partial standby brightness level to conserve power and, if desired, may place other components such as processing circuitry, wireless transceiver circuitry, etc. in a standby mode to conserve power. Certain operations may continue when device 10 enters mode 72. For example, a music playback operation or a telephone call may continue uninterrupted when device 10 enters mode 72.

Device 10 may perform gaze detection operations while in mode 72. For example, device 10 may continually capture images using camera 30 at regular intervals and may analyze the captured images using gaze detection software to determine whether the user's gaze has returned to device 10 and display 16. If desired, the rate at which device 10 captures and processes images for gaze detection operations while in mode 72 may be reduced relative to the rate at which gaze detection images are captured and processed while device is in an active mode such as mode 68 (e.g., device 10 may capture images at a rate of once every 100 milliseconds, 250 milliseconds, 500 milliseconds, 1 second, etc. in mode 72 and once every 50 milliseconds, 125 milliseconds, 250 milliseconds, 500 milliseconds, etc. in mode 68).

Device 10 may switch from partial standby mode 72 to active mode 68 whenever appropriate. For example, when device 10 detects that a user's gaze is directed towards display 16, device 10 may enter an active mode such as mode 68 (e.g., as illustrated by line 75) and may brighten display 16 to the active brightness level. Device 10 may also enter active mode 68 when device 10 detects activity such as user activity received through a button such as button 19 and network activity received through a wired or wireless communications link (e.g., as illustrated by line 74). In general, device 10 will enter active mode 68 whenever a user resumes interacting with device 10 or device 10 needs to respond to network activity. Because device 10 enters active mode 68 when device 10 detects that the user's gaze is directed towards display 16 (e.g., as illustrated by line 75), the user of device 10 need not press a button or provide other input to awaken device 10 from the partial standby state. Instead, device 10 can automatically awaken (e.g., switch to active mode 68) when device 10 detects that the user has directed their gaze towards display 16.

If desired, device 10 may operate in a standby mode such as standby mode 76 in which display 16 is turned off. For example, when device 10 is operating in partial standby mode 72 and no user activity is detected for a given period of time (e.g., within a period of time such as one second, two seconds, . . . , ten seconds, twenty seconds, thirty seconds, etc.), device 10 may enter standby mode 76 and turn off display 16. Device 10 may enter standby mode 76, as illustrated by line 79, after device 10 detects that the user has looked away (e.g., as illustrated by line 70) and after a given period of user inactivity has elapsed following the device's detection that the user looked away.

In standby mode 76, device 10 may operate with display 16 turned off. Device 10 may place suitable components into standby. For example, device 10 may turn wireless transceiver circuitry off, reduce the power consumption of processing circuitry such as circuitry 36 (e.g., by turning off selected processing cores or lowering clock rates), turn off sensors such as proximity sensors, ambient light sensors, and accelerometers, and may suspend or power down any other suitable components. If desired, certain operations may continue when device 10 enters and operates in standby mode 76. For example, a music playback operation or a telephone call may continue uninterrupted when device 10 enters mode 76.

With the arrangement of FIG. 5, as long as device 10 detects that the user's gaze is directed at the device (e.g., the user is looking at display 16), device 10 may remain in active mode 68. Device 10 may remain in active mode 68 even when no other user activity is received (e.g., when the user is not pressing a button such as button 19 or providing user input through a touch screen such as touch screen display 16). This type of arrangement may be beneficial when a user is utilizing device 10 without providing user input and would be inconvenienced by device 10 implementing power management techniques. Device 10 can override power management schemes such as dimming a display screen based on results of gaze detection operations. For example, when device 10 detects a user's gaze and is presenting the user with text or video through display 16, device 10 may override power management instructions that could otherwise reduce the power of display 16 to ensure that display 16 is not dimmed or turned off even though the user has not provided direct user input.

If desired, device 10 may continue to perform gaze detection operations when operating in standby mode 76. As illustrated by dashed line 77, device 10 may switch from standby mode 76 to active mode 68 whenever device 10 detects that a user's gaze is once again directed towards display 16.

As illustrated by line 78, when device 10 detects activity, device 10 may switch from mode 76 to active mode 68 (e.g., device 10 may turn on display 16 to the active brightness level). As an example, device 10 may enter active mode 68 in response to user activity such as button press activity received through a button such as button 19 and in response to other activity such as network activity (e.g., activity received through a wired or wireless communications link).

Figure 6:
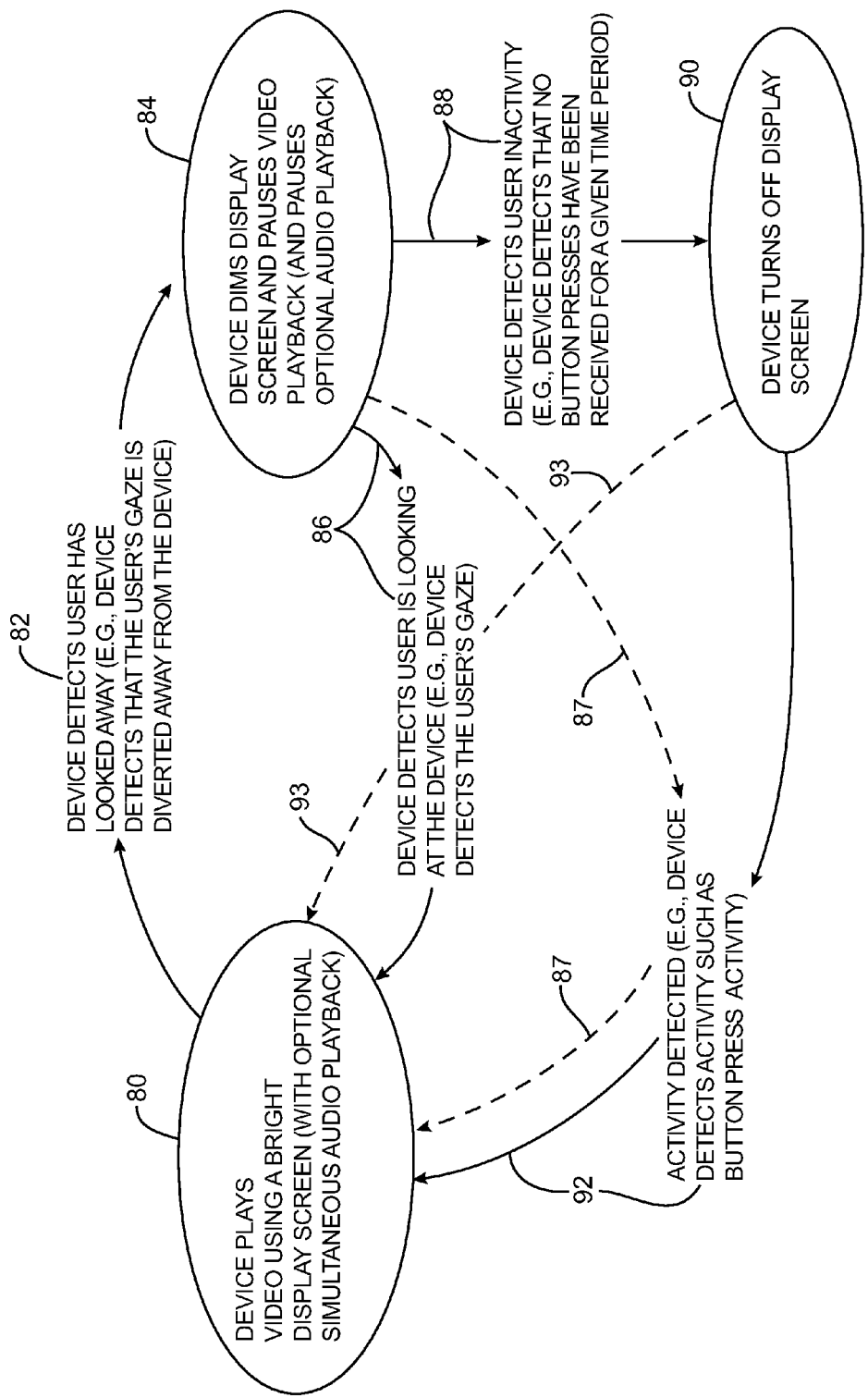
FIG. 6 is a state diagram of illustrative operating modes of an illustrative electronic device with gaze detection capabilities during a video playback operation in accordance with an embodiment of the present invention.

As illustrated in FIG. 6, device 10 may implement a power management scheme that utilizes gaze detection capabilities while executing a video playback operation (e.g., while playing video for a user). In the scheme illustrated by FIG. 6, device 10 can operate in an active mode (mode 80), a pause standby mode (e.g., a partial standby mode such as mode 84), and a standby mode (mode 90). With one suitable arrangement, device 10 may be performing a video playback operation for a user when the device is in the active mode, device 10 may pause the video playback operation and dim an associated display screen when the user looks away from the device and the device enters the pause standby mode, and device 10 may turn off the display screen (e.g., the screen used for the video playback operation) if the user does not look back towards the device within a given period of time and no other user activity is detected.

In active mode 80, device 10 is active. While device 10 is in the active mode, device 10 may perform gaze detection operations (e.g., using camera 30 and processing circuitry 36 to detect whether or not a user is gazing at display 16). While in mode 80, device 10 may perform a video playback operation. For example, device 10 may display video on display 16 and may play audio associated with the video through a speaker such as speaker 22 or through a headphone accessory such as accessory 46. Display 16 may display the video at an active brightness level (e.g., display 16 may be at a relatively bright display level).

When device 10 detects that the user has looked away from display 16 (e.g., using a gaze detection sensor such as camera 30), device 10 may dim display 16 and enter pause standby mode 84 as illustrated by line 82. As part of entering pause standby mode 84, device 10 may pause the video playback operation of mode 80. Generally, when device 10 pauses the video playback operation, device 10 will also pause an accompanying audio playback associated with the video playback operation. The user may, if desired, configure whether device 10 pauses the audio.

In mode 84, device 10 is in a pause standby mode. In pause standby mode 84, device 10 may dim display 16 to a pause standby brightness level (e.g., a partial standby brightness level) to conserve power. The video playback operation of mode 80 may be paused while device 10 is in mode 84. If desired, device 10 may place components such as processing circuitry and wireless transceiver circuitry in a standby mode while device 10 is in mode 84 (e.g., by turning off unused CPU cores or reducing clock rates).

With one suitable arrangement, device 10 may be performing gaze detection operations while in pause standby mode 84. For example, device 10 may capture images using camera 30 at regular intervals and may analyze the images using gaze detection software to continually monitor whether the user's gaze has returned to device 10 and display 16.

Device 10 may switch from pause standby mode 84 to mode 80 whenever appropriate. For example, whenever device 10 detects that a user's gaze is once again directed towards display 16, device 10 may enter an active mode such as mode 80 (e.g., as illustrated by line 86), brighten display 16 to the active brightness level, and resume the video playback operation. Device 10 may also enter mode 80 when device 10 detects activity such as user activity received through a button such as button 19 or network activity received through a wired or wireless communications link (e.g., as illustrated by dashed line 87). In general, device 10 will enter mode 80 whenever a user resumes interacting with device 10.

Because device 10 enters mode 80 when it detects that the user's gaze is directed towards display 16 (e.g., as illustrated by line 86), the user of device 10 need not press a button or provide other input to awaken device 10 from the pause standby state and resume the video playback operation of mode 80. Instead, device 10 can automatically awaken itself (e.g., switch to mode 80) and resume the video playback operation when the user directs their gaze towards display 16.

If desired, device 10 may operate in a standby mode such as standby mode 90 in which display 16 is turned off. For example, when device 10 is operating in pause standby mode 84 and no user activity is detected for a given period of time (e.g., within a period of time such as one second, two seconds, . . . , ten seconds, twenty seconds, thirty seconds, etc.), device 10 may enter standby mode 90 and turn off display 16. Because standby mode 90 involves a lower power state for device 10 then pause standby mode 84, mode 90 may sometimes referred to as full standby mode. As illustrated by line 88 in FIG. 6, device 10 may enter full standby mode 90 after device 10 detects that the user has looked away (e.g., as illustrated by line 82) and after a given period of user inactivity has elapsed following the device's detection that the user looked away.

In standby mode 90, device 10 may operate with display 16 turned off. Device 10 may also place other suitable components into standby (e.g., wireless circuitry, etc.).

With the arrangement of FIG. 6, as long as device 10 detects that the user's gaze is directed at the device (e.g., the user is looking at display 16), device 10 may remain in active mode 80 and video playback operation can continue (e.g., until the video is completed or the operation is stopped). Device 10 may remain in mode 80 even when no other user activity is being received (e.g., when the user is not pressing a button such as button 19 or providing user input through a touch screen such as touch screen display 16). This type of arrangement may be beneficial when a user is viewing a video on display 16 of device 10 without providing user input and would be inconvenienced if device 10 were to attempt to conserve power by dimming the video screen. Device 10 can pause the video playback operation when the user temporarily looks away and can then resume operation when the user returns their gaze to device 10. This allows the user of device 10 to automatically pause a video without having to provide direct user input (e.g., without selecting a pause button). The video can be paused simply by looking away from a video display such as display 16.

If desired, device 10 may continue to perform gaze detection operations when operating in standby mode 90. As illustrated by dashed line 93, device 10 may switch from standby mode 90 to active mode 80 and resume the video playback operation of mode 80 when device 10 detects that a user's gaze is again directed towards display 16.

As illustrated by line 92, when device 10 detects activity, device 10 may switch from mode 90 to active mode 80 (e.g., device 10 may turn on display 16 to the active brightness level). As an example, device 10 may enter active mode 80 in response to user activity such as button press activity received through a button such as button 19 and in response to other activity such as network activity (e.g., activity received through a wired or wireless communications link).

If desired, device 10 may automatically resume a video playback operation when the device switches to active mode 80 from a standby mode such as pause standby mode 84 or full standby mode 90. With another suitable arrangement, device 10 may present the user with an option such as an on-screen selectable option to resume the video playback operation when the device switches to active mode 80.

Figure 7:
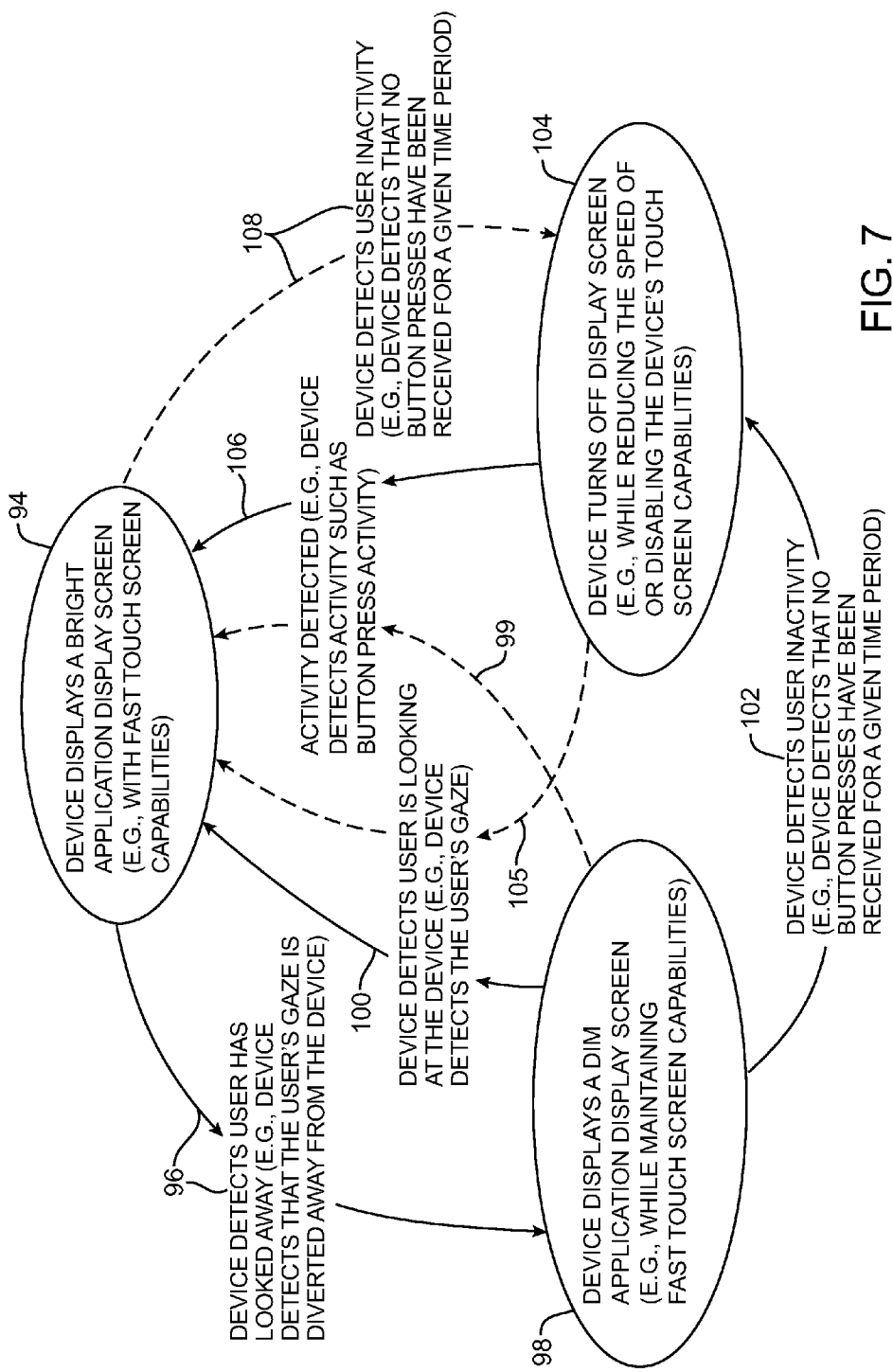
FIG. 7 is a state diagram of illustrative operating modes of an illustrative electronic device with gaze detection and touch screen input capabilities in accordance with an embodiment of the present invention.

Device 10 may have touch screen capabilities and may implement a power management scheme using gaze detection capabilities to control the device's touch screen capabilities. With this type of scheme, which is illustrated by FIG. 7, device 10 can switch between an active mode, a partial standby mode, and a standby mode.

Touch screen functions can be adjusted to conserve power. For example, display 16 may be a touch screen display that can operate at varying speeds (e.g., a fast speed and a slow speed) or with varying levels of functionality (e.g., general touch sensitivity, localized touch sensitivity, and gesture-capable touch sensitivity). These features can be adjusted based on gaze detection data.

With one suitable arrangement, touch screen display 16 may operate at a first frequency (e.g., at a relatively high speed) when device 10 is in active mode 94 and a second frequency (e.g., a relatively low speed) when device 10 is in standby mode 104. The frequency of touch screen display 16 may be the frequency at which the touch screen scans for user input (e.g., once every 10 milliseconds, 50 milliseconds, 100 milliseconds, 200 milliseconds, etc.).

If desired, touch screen display 16 may operate at a first level of functionality when device 10 is in mode 94 and at a second level of functionality when device 10 is in mode 104. For example, when device 10 is in active mode 94, touch screen display 16 may be configured to sense the location of user input within the area of display 16. Device 10 may also be configured to sense user inputs such as multi-touch user inputs and gestures such as swipe gestures and swipe and hold gestures while in mode 94. In contrast, when device 10 is in standby mode 104, touch screen display 16 may be configured such that display 16 can sense general user input such as the presence or absence of contact without being able to resolve the location of the input. The power consumption of display 16 may be reduced when display 16 is configured in this way.

In mode 94, device 10 is in an active mode. While device 10 is in the active mode, device 10 may perform gaze detection operations. Touch screen display 16 may be operating at a relatively high frequency (e.g., in the high power mode) while device 10 is in active mode 94. With another suitable arrangement, touch screen display 16 may be operating at or near its maximum capability (e.g., touch screen display 16 may be configured to sense the location of user inputs and to sense user inputs such as multi-touch inputs and gestures). Display 16 may also be displaying an application display screen (e.g., a home page, a telephone application information page, a media player screen, etc.) at an active brightness level.

When device 10 detects that the user has looked away from display 16 (e.g., using a gaze detection sensor such as camera 30), device 10 may dim display 16 and enter partial standby mode 98, as illustrated by line 96.

In mode 98, device 10 is in a partial standby mode. In partial standby mode 98, device 10 may dim display 16 to a partial standby brightness level to conserve power and may retain the touch screen capabilities of display 16. (Alternatively, touch screen capabilities can be reduced in mode 98.)

Device 10 may switch from partial standby mode 98 to active mode 94 whenever appropriate. For example, when device 10 detects that a user's gaze is directed towards display 16, device 10 may enter an active mode such as mode 94 (e.g., as illustrated by line 100) and may brighten display 16 to the active brightness level. Device 10 may also enter active mode 94 when device 10 detects user activity (e.g., as illustrated by dashed line 99). In arrangements in which the touch screen capabilities of display 16 remain at the active mode level when device 10 is in mode 98, display 16 may be able to receive location specific user inputs (e.g., inputs specific to a particular portion of display 16) while device 10 is in mode 98.

If desired, device 10 may operate in a full standby mode such as standby mode 104 in which display 16 is turned off and the touch screen capabilities of display 16 are reduced. As an example, when device 10 is operating in partial standby mode 98 and no user activity is detected for a given period of time, device 10 may enter standby mode 104. Device 10 may enter standby mode 104 as illustrated by line 102 after device 10 detects that the user has looked away (e.g., as illustrated by line 96) and after a given period of user inactivity has elapsed following the device's detection that the user has looked away.

With another suitable arrangement, device 10 may enter standby mode 104 directly from active mode 94 when no user activity is detected for a configurable period of time (e.g., as illustrated by dashed line 108). Device 10 may enter standby mode 104 even when device 10 detects that a user's gaze is directed towards display 16. If desired, the time period of user inactivity required before device 10 enters mode 104 directly from mode 94 (e.g., when a user's gaze is still directed towards device 10) may be longer than the time period of user inactivity required before device 10 enters mode 104 from mode 98 (e.g., when the user's gaze is not directed towards device 10). For example, the inactivity period associated with the mode transition of line 108 may be one minute or more while the inactivity period associated with the mode transition of line 102 may be thirty seconds or less.

In standby mode 104, device 10 may operate with a display portion of display 16 turned off. The display portion of display 16 and a touch screen portion of display 16 may be powered and configured independently. In mode 104, device 10 may reduce the touch screen capabilities of the touch screen portion of display 16 (e.g., by reducing the frequency at which touch screen display 16 scans for user input, by configuring display 16 such that user inputs can only be sensed generally, by disabling the touch screen capabilities of display 16, etc.).

If desired, device 10 may continue to perform gaze detection operations when operating in standby mode 104. As illustrated by dashed line 105, device 10 may switch from standby mode 104 to active mode 94 when device 10 detects that a user's gaze is directed towards display 16.

As illustrated by line 106, device 10 may also switch from mode 104 to active mode 94 when activity is detected (e.g., device 10 may turn on display 16 to the active brightness level and restore the touch screen capabilities of display 16 to the active capability level).

If desired, power can be further conserved by reducing the power consumption of components such as a processor, wireless communications circuitry, etc. while in full standby mode 104 and/or partial standby mode 98. For example, when device 10 is placed in full standby mode 104 or partial standby mode 98, the clock frequency for the clock that is used to operate processing circuitry 36 (e.g., a microprocessor) may be reduced. The number of processor cores that are active in processing circuitry 36 may also be reduced. Some or all of wireless communications circuitry 44 may be placed in a low-power state or turned off. The amount of additional circuitry that is powered down when device 10 enters modes 98 and 104 may be the same or, if desired, relatively more circuitry may be powered down in full standby mode 104 than in partial standby mode 98.

In configurations in which device 10 has additional components, some or all of these components can be selectively powered down. Device 10 may have additional power down modes in which different numbers of these components have been placed in low-power states. Any suitable criteria may be used to determine when to switch device 10 between these modes. For example, gaze detection data, user input data, and/or sensor data may be used to determine an appropriate mode in which to operate device 10. Components that may be powered down in this way include proximity sensors, light sensors such as an ambient light sensor, cameras, motions sensors such as accelerometers, audio circuits, radio-frequency transceiver circuitry, radio-frequency amplifiers, audio amplifiers, serial and parallel port communications circuits, thermal sensors, touch-screen input devices, etc.

Figure 8:
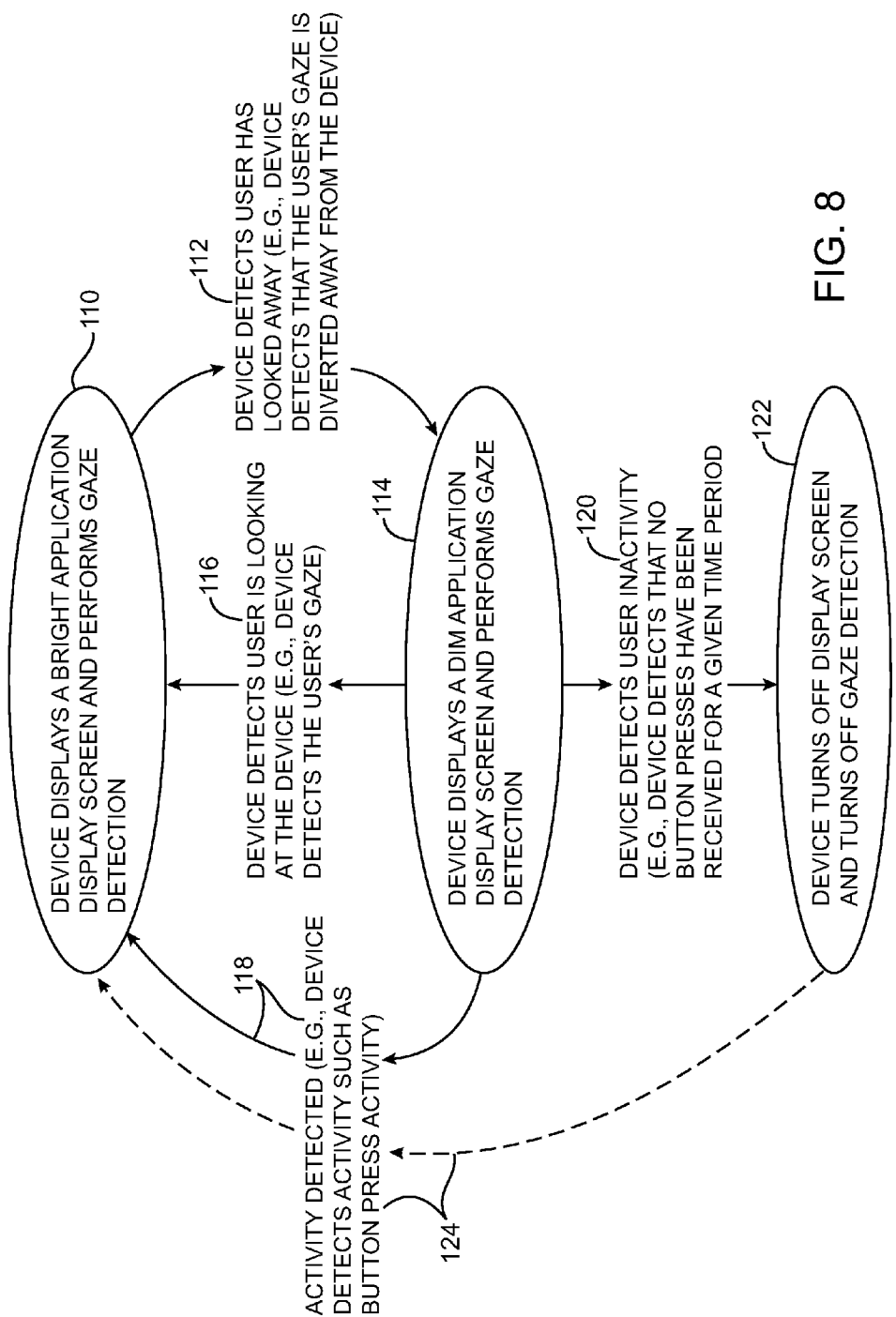
FIG. 8 is a state diagram of illustrative operating modes of an illustrative electronic device with gaze detection capabilities in accordance with an embodiment of the present invention.

As illustrated by FIG. 8, device 10 can implement a power management scheme in which gaze detection circuitry is turned on or off or is otherwise adjusted in real time. In the scheme illustrated by FIG. 8, device 10 can switch between an active mode, a partial standby mode, and a standby mode.

The gaze detection capabilities of device 10 can be adjusted to conserve power depending on the mode in which device 10 is operating. For example, device 10 may perform gaze detection operations by taking images using camera 30 or other imaging circuitry at a first rate while in an active mode and at a second rate that is less than the first rate while in a standby mode. If desired, device 10 may suspend gaze detection operations while in standby. When the gaze detection operations of device 10 are slowed down (e.g., performed at the second rate) or suspended, device 10 may consume a reduced amount of power.

In mode 110, device 10 is in an active mode. While device 10 is in the active mode, device 10 may perform gaze detection operations. For example, device 10 may perform gaze detection operations by taking images at a given rate to search for a user's gaze (e.g., once every 100 milliseconds, 200 milliseconds, 250 milliseconds, 500 milliseconds, 1 second, 2 seconds, etc.). These images may then be analyzed to determine whether the user of device 10 is looking at device 10. Display 16 may simultaneously display an application display screen (e.g., a home page, a telephone application information page, a media player screen, etc.) at an active brightness level.

When device 10 detects that the user has looked away from display 16 (e.g., using a gaze detection sensor such as camera 30), device 10 may dim display 16 and enter partial standby mode 114 as illustrated by line 112.

In mode 114, device 10 is in a partial standby mode. In partial standby mode 114, device 10 may dim display 16 to a partial standby brightness level to conserve power. If desired, device 10 may also reduce the speed at which images are captured for gaze detection operations in device 10 (e.g., to a lower multiple of the rate at which gaze detection images were captured in mode 110 such as one-half, one-quarter, etc. of the rate in mode 110).

Device 10 may switch from partial standby mode 114 to active mode 110 whenever appropriate. For example, when device 10 detects that a user's gaze is directed towards display 16, device 10 may enter an active mode such as mode 110 (e.g., as illustrated by line 116) and may brighten display 16 to the active brightness level. Device 10 may also enter active mode 110 when device 10 detects user activity (e.g., as illustrated by line 118).

If desired, device 10 may operate in a full standby mode such as standby mode 122 in which display 16 is turned off and the gaze detection capabilities of device 10 are also turned off (e.g., camera 30 is turned off). As an example, when device 10 is operating in partial standby mode 114 and no user activity is detected for a given period of time, device 10 may enter standby mode 122. Device 10 may enter standby mode 122 as illustrated by line 120 after device 10 detects that the user has looked away (e.g., as illustrated by line 116) and after a given period of user inactivity has elapsed following the device's detection that the user has looked away.

In standby mode 122, device 10 may operate with display 16 turned off and with gaze detection disabled (e.g., turned off). Other circuitry may also be placed in a low-power standby mode (e.g., processing circuitry).

As illustrated by dashed line 124, when device 10 detects activity, device 10 may switch from mode 122 to active mode 110 (e.g., device 10 may turn on display 16 to the active brightness level and turn on gaze detection capabilities to determine is a user's gaze is directed towards display 16).

With one suitable arrangement, when device 10 detects activity such as user activity, the period of user inactivity detected by device 10 and associated with the mode transition of line 120 may be reset. For example, when device 10 switches from mode 122 to active mode 110 and determines that the user's gaze is not directed towards display 16, device 10 may switch to mode 114 and the given period of user inactivity associated with the mode transition of line 120 may begin anew.

The motion of device 10 can be indicative of whether device 10 is being used by a user. If desired, device 10 may use data from an accelerometer or other motion sensor in selecting its mode of operation. For example, when device 10 detects motion above a threshold level with an accelerometer, device 10 may activate gaze detection operations to determine if a user is looking at the device. Device 10 may turn on gaze detection circuitry or may temporarily activate gaze detection operations for a given period of time (e.g., one second, five seconds, etc.) whenever a motion sensor such as an accelerometer detects that a user is shaking device 10 or device 10 is otherwise in motion. With this type of arrangement, device 10 may be in standby mode. When device 10 is picked up by a user, device 10 may detect that the device is in motion using the accelerometer. Device 10 may then activate gaze detection operations and, if the user's gaze is properly detected, may switch to an active mode such as mode 68 in which display 16 is turned on.

Device 10 may also suspend gaze detection operations when appropriate. For example, when device 10 is receiving user input through an input-output device 38 (e.g., when a user is providing user input through one or more user input devices) or when device 10 has recently received user input, gaze detection operations may be suspended (e.g., camera 30 may be turned off and the execution of gaze detection software may be stopped). In this situation, the presence of user interface activity makes it unnecessary to expend extra power operating the gaze detection circuitry.

Figure 9:
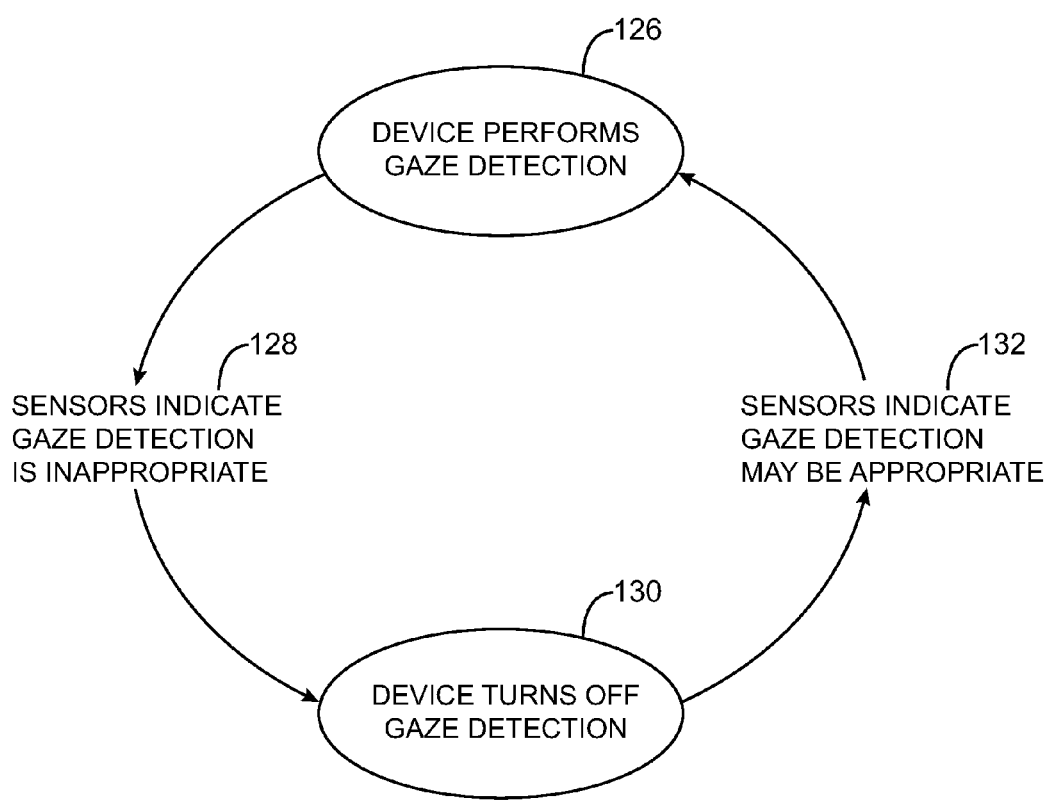
FIG. 9 is a state diagram of illustrative operating modes of an illustrative electronic device with gaze detection capabilities and sensors such as environment sensors in accordance with an embodiment of the present invention.

As illustrated by FIG. 9, device 10 may also use information from environmental sensors such as proximity sensors and ambient light sensors to determine whether or not to perform gaze detection operations. Environmental sensors such as these may, if desired, be used in conjunction with an environmental sensor such as an accelerometer that detects device motion.

When device 10 is performing gaze detection operations (e.g., when device 10 is operating in a mode such as mode 126), device 10 may suspend gaze detection operations whenever a sensor in device 10 indicates that gaze detection operations are inappropriate or not needed (e.g., as illustrated by line 128). With one suitable arrangement, device 10 may be able to detect when gaze detection sensors such as camera 30 would be incapable of detecting a user's gaze due to excessive vibration detected by an accelerometer. For example, device 10 may suspend gaze detection operations (e.g., device 10 may switch to operating in mode 130) in response to signals from the accelerometer in device 10 that indicate the device is shaking or otherwise moving rapidly. In this example, device 10 may switch to mode 130 when the accelerometer detects that the acceleration of device 10 exceeds a given threshold level. In another example, device 10 may be able to detect, using a proximity sensor, that gaze detection operations are inappropriate because an object is in close proximity to device 10 and is blocking the device's gaze detection sensors (e.g., such as when a user places device 10 against their ear and thereby blocks camera 30). If desired, device 10 may suspend gaze detection operations when an ambient light sensor detects that there is insufficient light in the environment around device 10 for a camera such as camera 30 to capture images in which a user's gaze could be detected. Device 10 may also deactivate a camera associated with gaze detection operations and suspend a gaze detection application running on circuitry 36 when data from one or more sensors in device 10 indicate that gaze detection operations are inappropriate or wasteful of power.

When device 10 detects that gaze detection operations may be appropriate (e.g., after the sensors no longer indicate that gaze detection operations are inappropriate), device 10 may resume gaze detection operations in mode 126, as illustrated by line 132. This type of arrangement may help device 10 to avoid performing gaze detection operations at inappropriate times, while ensuring that the power conserving functionality of the gaze detection circuitry is retained during normal device operation.

The gaze detection capabilities of device 10 may, if desired, include visual user identification capabilities (e.g., face recognition). In this type of arrangement, device 10 may distinguish between authorized users and unauthorized users based on image sensor data. For example, device 10 may recognize an authorized user and may unlock itself whenever the authorized user is detected by the device's gaze detection circuitry (e.g., camera 30). If desired, when device 10 detects that the authorized user's gaze has been diverted from device 10, device 10 may lock itself to prevent unauthorized users from using device 10. This type of user-specific gaze detection functionality may be used for all gaze detection operations if desired. By making gaze detection specific to particular users, device 10 will not inadvertently transition from standby mode to active mode if a person in the user's vicinity happens to glance at the user's device.

Figure 10:
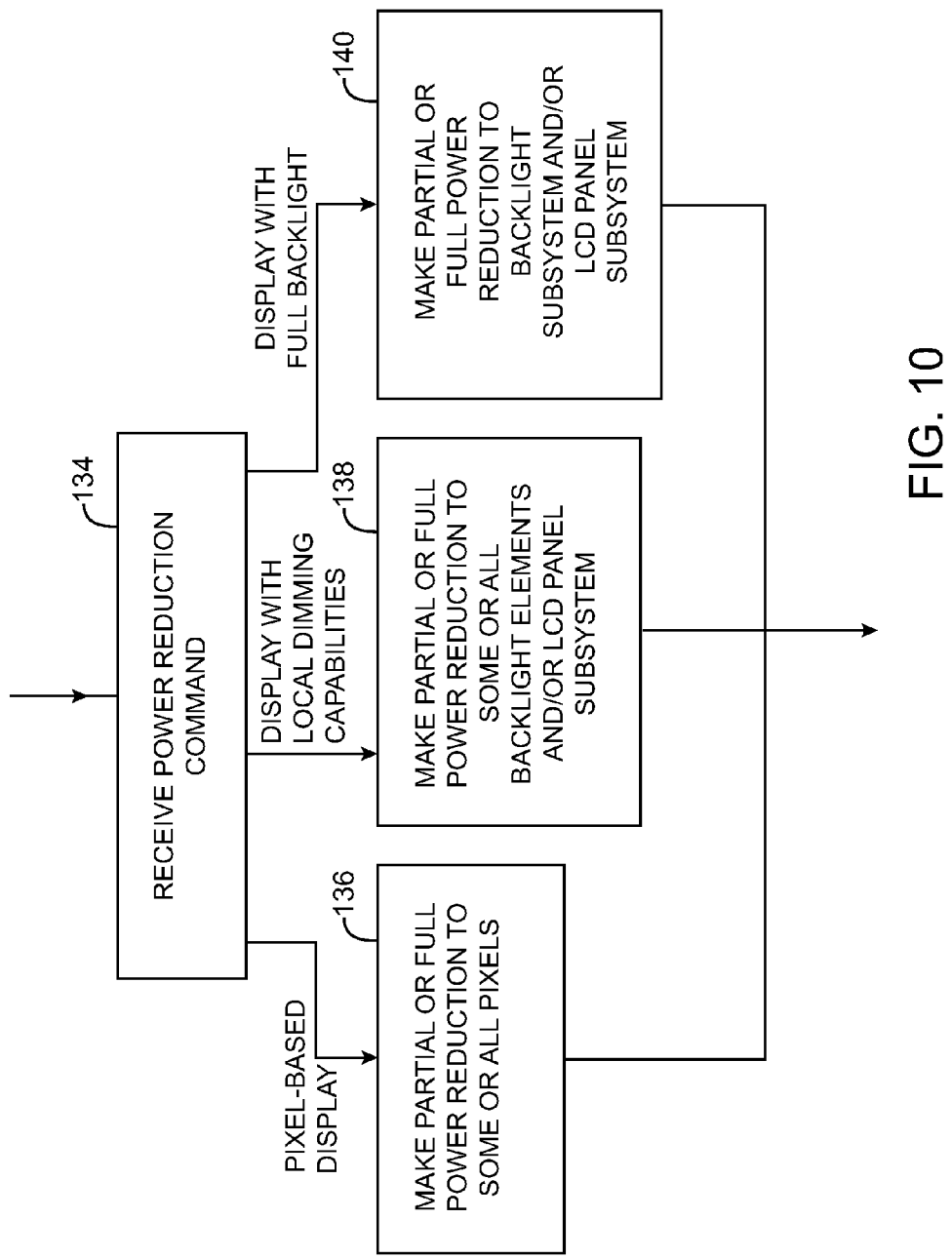
FIG. 10 is a flow chart of illustrative steps involved in reducing power to displays in an electronic device in accordance with an embodiment of the present invention.

FIG. 10 shows steps involved in processing a command to reduce the power consumption of display 16. Power reduction commands may be processed by device 10 based on gaze detection data or any other suitable data.

As show by step 134, processing may begin with reception of a power reduction command by the processing circuitry of device 10.

Display 16 may be an OLED display or other display that has pixels that may be controlled individually. As shown by box 136, in this type of situation, device 10 may make partial or full power reduction to some or all of the pixels of display 16 in response to the received power reduction command.

Display 16 may also be formed from a panel subsystem and a backlight subsystem. For example, display 16 may have a liquid crystal display (LCD) panel subsystem and a light emitting diode or fluorescent tube backlight subsystem. In backlight subsystems that contain individually controllable elements such as light emitting diodes, the brightness of the backlight elements may be selectively controlled. For example, as shown in step 138, the brightness of some of the backlight elements may be reduced while the other backlight elements remain fully powered.

In backlight subsystems that contain a single backlight element, the power of the single element may be partially or fully reduced to reduce power consumption (step 140).

During the operations of steps 138 and 140, further power reductions may be made by adjusting circuitry that controls the LCD panel subsystem.

The foregoing is merely illustrative of the principles of this invention and various modifications can be made by those skilled in the art without departing from the scope and spirit of the invention.

What is claimed is:

1. A method for minimizing power consumption in a portable electronic device that has a touch screen display and gaze detection circuitry, the method comprising:
   performing a video playback operation in which video is displayed on the touch screen display;
   with the gaze detection circuitry, capturing images of a user at a first rate and, while the touch screen display receives touch screen inputs from the user, determining that the user's gaze is not directed towards the touch screen display based on the captured images; and
   in response to determining, while the touch screen display receives the touch screen inputs from the user, that the user's gaze is not directed towards the touch screen display, pausing the video playback operation and reducing the rate of image capture from the first rate to a second rate, wherein in response to a given period of user inactivity after determining that the user's gaze is not directed towards the touch screen display, the gaze detection circuitry transitions from capturing images at the second rate to a turned off state.

2. The method defined in claim 1 further comprising:
   after it has been determined that the user's gaze is not directed towards the touch screen display, determining whether the user's gaze has returned to the touch screen display; and
   when it has been determined that the user's gaze has returned to the touch screen display, resuming the video playback operation.

3. The method defined in claim 1 further comprising:
   after it has been determined that the user's gaze is not directed towards the touch screen display, determining whether the user's gaze has returned to the touch screen display; and
   in response to determining that the user's gaze has returned to the touch screen display, presenting an on-screen selectable option to resume the video playback operation.

4. The method defined in claim 1 further comprising:
   when it has been determined that the user's gaze is not directed towards the touch screen display, placing the touch screen display in an operating mode that reduces power consumption by the touch screen display.

5. The method defined in claim 4 wherein the touch screen display is at a first brightness level during the video playback operation and wherein placing the touch screen display in the operating mode comprises reducing the brightness of the touch screen display to a second brightness level.

6. The method defined in claim 5 further comprising:
   after it has been determined that the user's gaze is not directed towards the touch screen display, determining whether the user's gaze has returned to the touch screen display; and
   when it has been determined that the user's gaze has returned to the touch screen display, increasing the brightness of the touch screen display to the first brightness level.

7. The method defined in claim 4 wherein placing the touch screen display in the operating mode that reduces power consumption comprises turning off the touch screen display.

8. The method defined in claim 1, wherein determining that the user's gaze is not directed towards the touch screen display comprises determining that the user's gaze is not directed towards the touch screen display while the user is listening to an audio track with the electronic device.

9. The method defined in claim 1, wherein determining that the user's gaze is not directed towards the touch screen display comprises determining that the user's gaze is not directed towards the touch screen display while the user presses a button on the electronic device.

10. The method defined in claim 1, wherein in response to the given period of user inactivity after determining that the user's gaze is not directed towards the touch screen display, the gaze detection circuitry transitions to the turned off state and does not perform gaze detection operations.

11. A method for operating a portable electronic device that has a touch screen display and a camera, the method comprising:

performing a video playback operation in which video is displayed on the touch screen display;

while the touch screen display receives touch screen inputs from the user, determining, with the camera, that a user is not looking at the touch screen display; and in response to determining, while the touch screen display receives the touch screen inputs from the user, that the user is not looking at the touch screen display, pausing the video playback operation and turning off the camera.

12. The method defined in claim 11, further comprising:

in response to determining, while the touch screen display receives the touch screen inputs from the user, that the user is not looking at the touch screen display, reducing a brightness level of the touch screen display; and in response to a given period of user inactivity while the touch screen display is at the reduced brightness level, turning off the touch screen display.

13. The method defined in claim 11 further comprising:

performing an audio playback operation that is associated with the video playback operation; and in response to determining, while the touch screen display receives the touch screen inputs from the user, that the user is not looking at the touch screen display, pausing the audio playback operation and the video playback operation.

14. The method defined in claim 12, wherein the given period of user inactivity is a first given period of user inactivity, and wherein the brightness level is reduced from a normal brightness level to the reduced brightness level, the method further comprising:

in response to a second given period of user inactivity that is longer than the first given period of user inactivity, turning off the touch screen display while the touch screen display is at the normal brightness level.

15. An electronic device comprising:

a touch screen display that displays video in a video playback operation;

an optical sensor that captures images of a user of the electronic device while the touch screen display receives touch screen inputs from the user, wherein the optical sensor captures the images at a given rate; and circuitry that processes the captured images of the user from the optical sensor to determine whether or not the user is looking at the touch screen display, wherein the circuitry pauses the video playback operation and the optical sensor captures the images of the user at a reduced rate when the circuitry determines, while the touch screen display receives the touch screen inputs, that the user is not looking at the touch screen display based on the captured images of the user, and wherein, in response to a given period of user inactivity after the circuitry determines that the user is not looking at the touch screen display, the optical sensor transitions from capturing the images of the user at the reduced rate to a turned-off state.

16. The electronic device defined in claim 15 further comprising:

an ambient light sensor that measures a brightness level of ambient light and wherein, when the light sensor makes a measurement that is less than a given brightness level, the circuitry suspends data processing operations to determine whether or not the user is looking at the touch screen display.

17. The electronic device defined in claim 15 wherein the touch screen display is disposed on a given surface of the electronic device and wherein the optical sensor comprises a camera disposed on the given surface of the electronic device.

18. The electronic device defined in claim 15 wherein the touch screen display is disposed on a front surface of the electronic device and wherein the optical sensor comprises a camera disposed on the front surface of the electronic device.

19. The electronic device defined in claim 15 wherein the electronic device is a cellular telephone.

20. The electronic device defined in claim 15 wherein the electronic device is a handheld electronic device.

21. The electronic device defined in claim 15 further comprising:

a light source that emits infrared light towards a user's face, wherein the optical sensor receives infrared light emitted from the light source and reflected off of the user's eyes.

22. The electronic device defined in claim 15 further comprising:

a light source that emits modulated infrared light towards a user's face, wherein the optical sensor comprises an optical sensor that is synchronized with the light source to detect reflections of the modulated infrared light.

23. The electronic device defined in claim 15, wherein the circuitry does not determine whether or not the user is looking at the touch screen display while the optical sensor is in the turned-off state.

* * * * *